United States Patent [19]

De Luca et al.

[11] 4,204,095

[45] May 20, 1980

[54] TELEPHONE MAIN DISTRIBUTING FRAME

[75] Inventors: Paul V. De Luca, Port Washington, N.Y.; Charles L. Gautier, Warren, N.J.

[73] Assignee: Porta Systems Corp., Syosset, N.Y.

[21] Appl. No.: 974,098

[22] Filed: Dec. 28, 1978

[51] Int. Cl.² ............................................... H04Q 1/14
[52] U.S. Cl. ..................................... 179/98; 361/428; 361/429
[58] Field of Search ............... 179/98, 91 R; 361/427, 361/428, 429

[56] References Cited

U.S. PATENT DOCUMENTS

| | | | |
|---|---|---|---|
| 3,780,351 | 12/1973 | Salmon et al. | 179/98 |
| 3,801,873 | 4/1974 | Stumpf et al. | 361/429 |
| 3,927,277 | 12/1975 | Wuyts et al. | 179/98 |
| 4,002,856 | 1/1977 | Sedlacek et al. | 361/428 |
| 4,117,273 | 9/1978 | Gautier et al. | 179/98 |
| 4,158,754 | 1/1979 | Yonezaki et al. | 361/428 |

*Primary Examiner*—Gerald Brigance
*Attorney, Agent, or Firm*—Charles E. Temko

[57] ABSTRACT

A main distributing frame for telecommunication lines adapted for single-sided administration and comprised of vertical supports adapted to extend between floor and ceiling approximately one inch in depth and spaced on seven inch centers. Intravertical jumpering is accomplished via three horizontal cable troughs, normal jumpering being routed through centrally disposed and lower troughs, with special service jumpering being run through an upper trough, thereby minimizing jumper congestion and build-up. Outside cable pairs may be cabled either through the top or the bottom of the frame, which may be aisle mounted, or may be mounted against a wall surface either parallel to or perpendicular to the equipment, thereby minimizing inter-aisle cabling.

3 Claims, 4 Drawing Figures

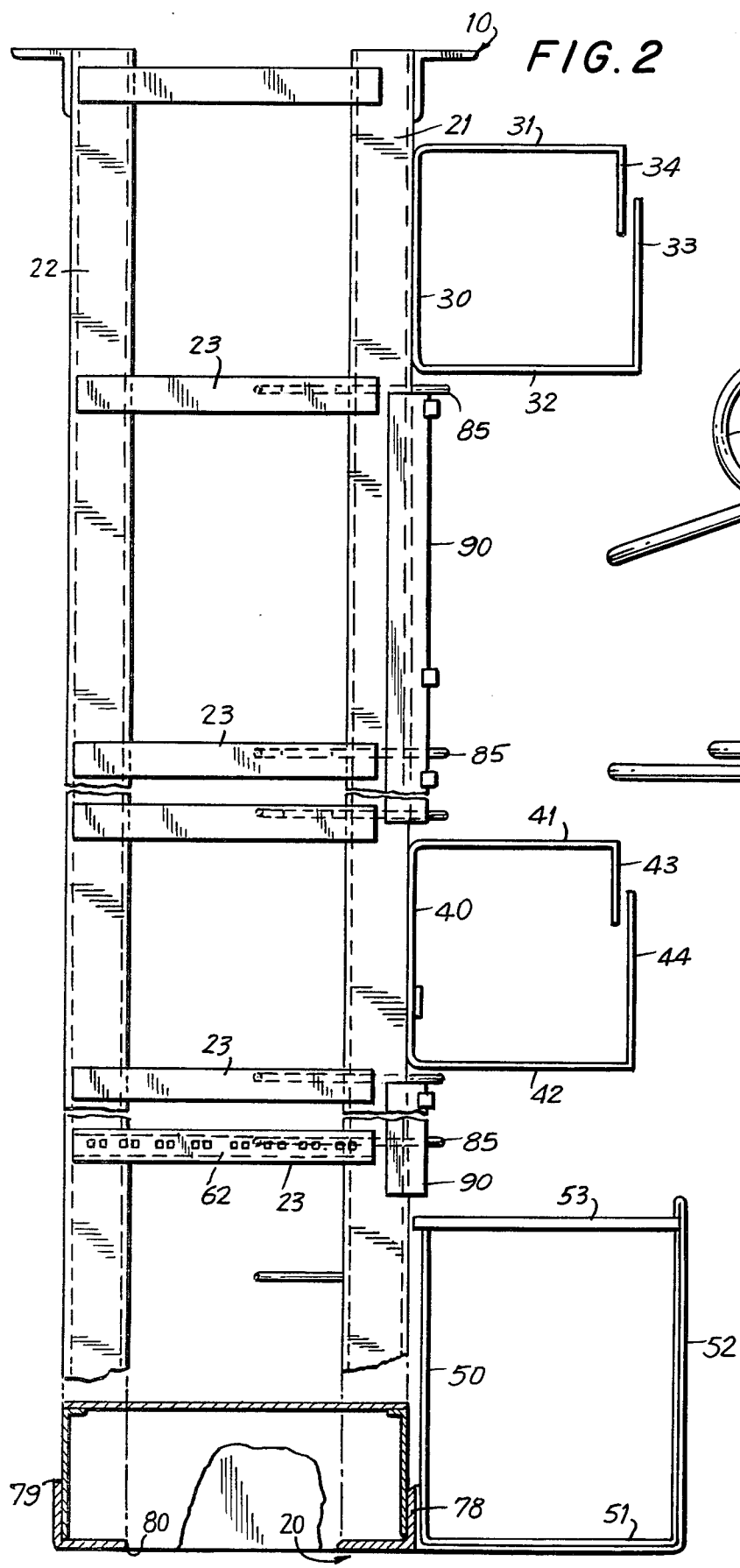

TELEPHONE MAIN DISTRIBUTING FRAME

BACKGROUND OF THE INVENTION

This invention relates generally to the field of telephony, and more particularly to an improved main distributing frame used in telephone offices for the interconnection of individual cable pairs to switching equipment. Main distributing frames of this general type are well known in the art, and the invention lies in specific constructional details which simplify manufacture, improve space utilization, and lower maintenance expenses due to the use of short jumpers, single-sided configuration, and other advantages, as compared with conventional distributing frames.

With the constant growth of subscribers in a given telephone office, the problem of accommodation of ever-growing connector pairs is constant. The known art includes many forms of main frames adapted to provide high space utilization with maximum connector pair density, while still providing adequate accessibility for servicing. To obtain such advantages, it is customary to provide connector blocks in which availability of terminals is possible only by providing protector terminals on one side of the frame and connector terminals on the opposite side. It follows that a corridor must be provided to allow accessibility to each side of the frame. While it is, of course, possible to have a plurality of such frames disposed upon a plant floor in mutually parallel relation, such arrangement precludes maximum space utilization possible by mounting frames against vertical walls or other areas where accessibility on one side only is possible. In the case of two-sided frames, expansion in co-planar fashion is difficult because of the lack of troughs and passages for jumpering and the accompanying difficulty of tracing connections.

In our prior patent, with Albert Atun, U.S. Pat. No. 4,117,273, granted Sept. 26, 1978, and assigned to the same assignee as the instant application, there is disclosed an improved single-sided frame in which some of the above mentioned problems are ameliorated to some degree by the provision of structure in which connections and protector blocks are positioned over a forward surface of the frame such that the exposed surfaces of the blocks are parallel to the plane of the frame, and the rear of the frame is provided with a large number of horizontal troughs which cooperate with a relatively fewer number of vertical troughs to accomplish horizontal and vertical jumpering. Using such construction, the rear surface of the frames are wired before the frames are positioned against a wall or other structure, and subsequent servicing is afforded only on the forward or exposed surface of the frames. While these constructions constituted an improvement over conventional main frame structure, a relatively large number of both vertical and horizontal cable-carrying troughs are required, which occupy space, and prevent the utilization of such space for the mounting of terminal blocks of one type or another. Additionally, in some installation situations, it is not always possible to prewire the rear surface of the frame in such manner as to preclude the possibility of future access.

SUMMARY OF THE INVENTION

Briefly stated, the invention contemplates the provision of an improved telephone main distributing frame construction, in which certain of the shortcomings of the prior art have been eliminated. The frame is intended for single-sided administration and is comprised of a plurality of vertical supports approximately eight feet high and arranged at intervals of approximately seven inches center to center. Intra-vertical jumpering is performed in interstices formed between the front and rear planes of the frame elements, through a series of jumper rings which are mounted on the individual frame elements. There are three large horizontally oriented troughs located at the top, center and bottom of the frame along the forward edges of the vertical supports to provide maximum accessibility for horizontal jumpering. While the frame may be used entirely for random, i.e. non-preferential assignment, the device may be utilized in such manner that with a relatively high percentage of preferential assignment, the maximum number of lines accommodated is substantially increased, the limiting factor being the capacity of the various horizontal troughs for intra-vertical jumpers. Because of relatively shallow depth, connecting and terminal blocks of many known types may be employed which allow either front cross-connect fields, or side access.

BRIEF DESCRIPTION OF THE DRAWINGS

In the drawings, to which reference will be made in the specification, similar reference characters have been employed to designate corresponding parts throughout the several views.

FIG. 2 is a fragmentary front perspective view thereof.

FIG. 3 is a top plan view of a jumper ring.

FIG. 4 is a side elevational view of a jumper ring.

DETAILED DESCRIPTION OF THE DISCLOSED EMBODIMENT

Figure 1:
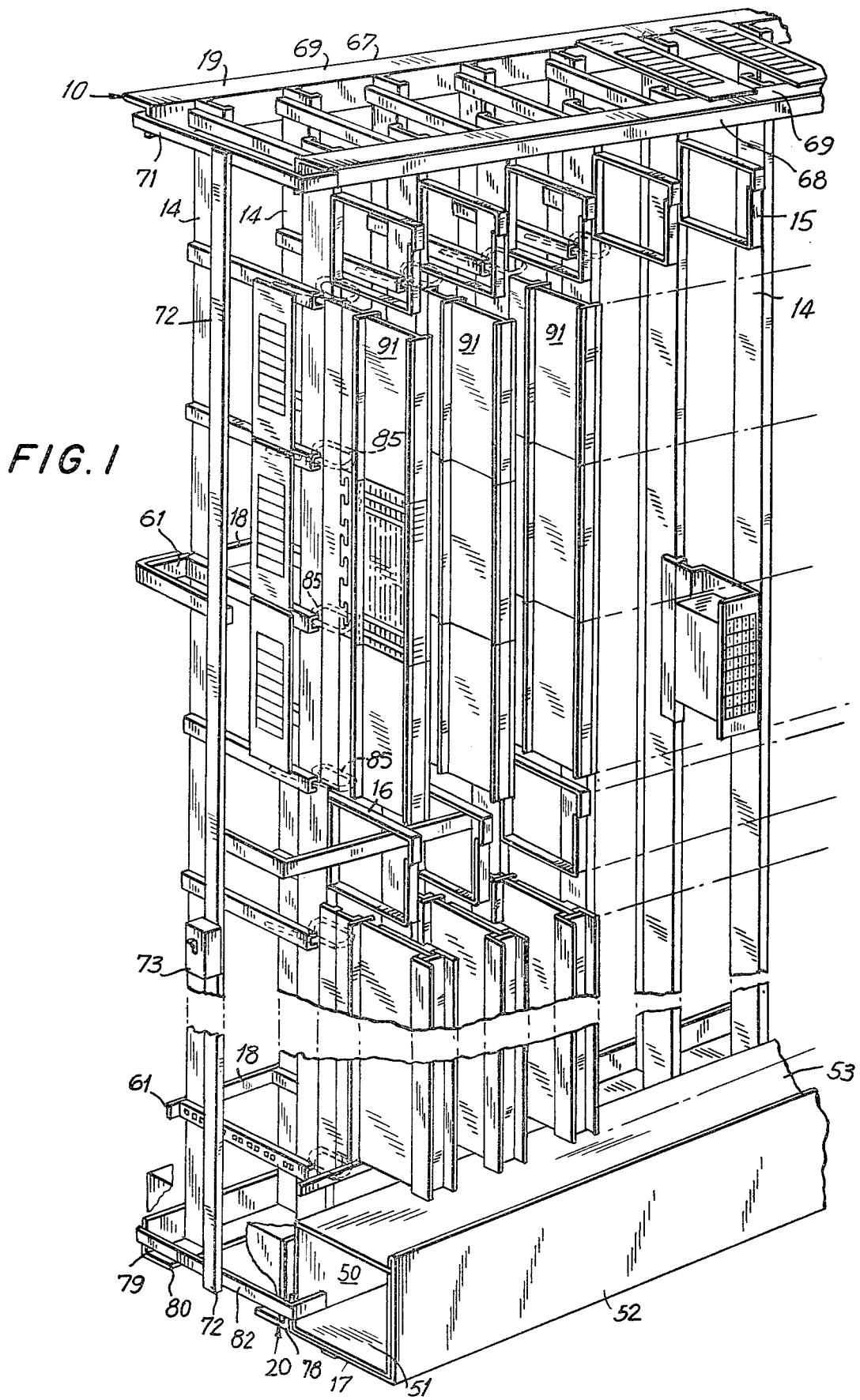
FIG. 1 is a side elevational view of an embodiment of the invention.

In accordance with the invention, the device, generally indicated by reference character 10, comprises broadly: a plurality of vertical planar elements 14, an upper trough element 15, a medially positioned trough element 16, a lower trough element 17, a plurality of grounding straps 18, upper mounting means 19, and lower mounting means 20.

The planar elements 14 are substantially similar, each including a forward vertical member 21, a rearward vertical member 22, and a plurality of horizontal interconnecting members 23, preferably attached by welding. In preferred form, the members 20 and 21 are approximately eight feet high, so as to readily extend between floor and ceiling, and the elements 14 are preferably maintained at seven-inch intervals to form an interstice which is readily manually accessible. A plurality of jumper rings 25 are mounted on each of the elements 14.

The upper trough 15 forms an open rectangular enclosure, and includes an inner vertical member 30, an upper horizontal member 31, a lower horizontal member 32, and overlapping outer vertical members 33 and 34, all of the above members being preferably formed by bending a unitary strip of metallic or synthetic resinous materials. Cables (not shown) are inserted in the trough by merely moving the overlapping members 33 and 34 apart, and allowing them to return to abutted relationship thereafter.

The medially disposed trough 16 is generally similar, including an inner vertical member 40, an upper horizontal member 41, a lower horizontal member 42, and overlapping outer members 43 and 44. Attachment to the planar elements 14 is preferably accomplished by spot welding (not shown) or similar procedure.

The lower trough element 17 is positioned immediately above the floor upon which the device is installed, and thus is in the path of the feet of workmen, the lower end of a step ladder used by them, and similar moving objects. In addition to being somewhat larger than the trough elements 15 and 16, it is, of necessity, considerably more sturdy. It includes an inner wall 50, a lower wall 51, an outer wall 52, and an upper removable cover 53.

The grounding straps 18 are preferably two in number, and serve not only as a grounding means, but as structural members. The upper strap 60 and lower strap 61 are connected to the rearward vertical members 22 of the element 14. They communicate at periodic intervals with flat copper strips 62 which are positioned within a hollow channel formed by certain of the interconnecting members 23, the opposite ends of the strips contacting connector blocks (not shown) which are mounted forwardly of the forward vertical member 21.

The upper mounting means 19 is adapted to abut a ceiling or other horizontal member (not shown) and includes forward and rearward angle members 67 and 68 respectively, the upper surfaces 69 of which provide physical contact. Optional end braces 71 may support a vertical member 72 which mounts a switch 73 for controlling illumination in the room in which a plurality of devices are installed.

The lower mounting means 20 is generally similar, and includes forward and rearward angle members 78 and 79, respectively, the lower surfaces 80 of which are adapted to be supported by a floor (not shown). End braces 83 engage the lower end of the vertical member 72.

Jumper rings 85 are mounted on individual planar elements 14 so that the loop portion thereof is disposed in a horizontal plane to accommodate vertical jumpers. Each ring includes a mounting bracket 86 and a single length of rod 87 bent to form a loop 88 having a point of entry 89 for insertion of jumpers in well known fashion.

The forward vertical members 21 are provided at the forward edges thereof with block mounting strips 90 upon which known terminal blocks 91 are mounted. In the case of the blocks used for incoming cable pairs, the blocks 91 will be mounted with principal plane thereof parallel to, if not coplanar with, that of a planar element 14, so as to allow access on either side thereof, and access rearward to rearwardly mounted boxes (not shown) which may be connected to switching equipment located within the building.

It will be observed that the connector blocks of varying types may be employed at substantially any desired location, and the interconnection of conductor pairs with terminals on the blank is a relatively simple matter owing to ample accessibility.

Horizontal jumpering takes place in one of the three horizontal trough elements lying substantially in the plane of the blocks being interconnected. Vertical jumpering is facilitated by the presence of jumper rings disposed in the interstice between adjacent planar elements 14. This interstice is approximately only 11 inches deep, and normally only the first four or five inches will be required for vertical jumpering.

It has been noted that the bottom trough element 17 is substantially larger in cross-section than the medial and upper trough elements 16 and 15, respectively. The trough element 17 will normally be employed for normal subscriber service. In offices having a relatively large number of preferential assignments, such connections are preferably made at points above the trough element 16, as are trunk circuits and certain subscriber line equipment, leaving the area below the center trough element for connecting outside plant cable.

We wish it to be understood that we do not consider the invention limited to the precise details of structure shown and set forth in this specification, for obvious modifications will occur to those skilled in the art to which the invention pertains.

We claim:

1. Improved telephone main distributing frame construction comprising: a plurality of vertical planar elements positioned in mutually parallel relation to define first generally rearward and second generally forward vertical coplanar edges, and an elongated interstice between pairs of adjacent elements; a plurality of jumper rings interconnected to at least one of each of said pair of adjacent elements, said rings lying substantially in a horizontal plane to accommodate generally vertically arranged jumper connectors passing therethrough; means for mounting connector blocks in generally vertical orientation on said forward edges of said planar elements; a plurality of generally horizontally arranged trough-forming elements mounted upon said planar elements at said forward edges, including a first trough-forming element adjacent an upper end of said planar elements, a second generally medially positioned trough-forming element, and a third trough-forming element positioned substantially at the lower end of said forward edges of said planar elements; whereby horizontal jumpering connections between connector blocks may be formed substantially adjacent the plane of said forward edges of said planar elements, and vertical jumpering connections may be formed within said interstices between adjacent planar elements.

2. Construction in accordance with claim 1, further characterized in each of said planar elements comprising a forwardly disposed and a rearwardly disposed elongated member, and a plurality of parallel horizontally disposed members interconnecting said forwardly and rearwardly disposed members.

3. Construction in accordance with claim 2, further characterized in said last mentioned horizontally disposed members being of channel-shaped configuration, and at least one of said last mentioned horizontally disposed members enclosing a grounding strap interconnecting said forwardly and rearwardly disposed elongated members; a grounding bar forming a structural member interconnecting a plurality of said planar elements, one end of said strap communicating with said bar, and a second end of said strap communicating with said mounting means.

* * * * *